April 12, 1938.   A. F. MEYER   2,113,796
VEHICULAR MOUNTING
Filed July 24, 1937   2 Sheets-Sheet 1

INVENTOR.
Arnold F. Meyer
BY Morsell, Lieber & Morsell
ATTORNEYS.

INVENTOR.
Arnold F. Meyer
BY Morsell, Lieber & Morsell
ATTORNEYS.

Patented Apr. 12, 1938

2,113,796

UNITED STATES PATENT OFFICE 2,113,796

VEHICULAR MOUNTING

Arnold F. Meyer, Pewaukee, Wis., assignor to The Heil Co., Milwaukee, Wis., a corporation of Wisconsin Application July 24, 1937, Serial No. 155,411

7 Claims. (Cl. 280—5)

The present invention relates in general to improvements in the art of supporting bodies upon carrier wheels or the like, and relates more specifically to an improved spring mounting for vehicular bodies which are subject to offset loads during normal use.

Generally defined, an object of my present invention is the provision of an improved vehicular mounting which is simple and compact in construction, and which is moreover highly efficient in operation.

The mounting of relatively large and bulky vehicular load carrying bodies such as liquid transporting tanks, for transportation over highways, presents many complex problems. In order to retain maximum stability, it is necessary to maintain the center of gravity of the load as low as possible at all times; and since the liquid confining tanks frequently extend a considerable distance outwardly beyond the spring supports, it is also extremely desirable to provide a structure which will transfer the loads to the axle as near to the carrier wheels as possible without interfering with the operation of the latter. The difficulty of solving these problems is augmented in the construction of so-called semi-trailers wherein the front portion of the tank is supported directly upon a propelling vehicle, while the rear tank portion is resiliently supported upon trailer wheels by means of springs coacting with the trailer axle and with frame structure coacting with the rear lower portion of the tank. In these semi-trailer assemblages, the frame structure must necessarily be confined to limited space without sacrificing requisite strength, and some of the reenforcing structure is frequently placed inside of the tank in order to resist the pressures and stresses without requiring the use of unduly heavy sheet material in the tank walls. None of the prior vehicular tank assemblages of this general type, have been entirely satisfactory both from the manufacturers' and from the users' standpoint, and these prior structures have all been either too complex, cumbersome and bulky, or insufficiently durable to withstand the wear and tear to which they were subjected.

It is therefore a more specific object of my present invention to provide an improved mounting especially applicable to vehicular tanks for highway use, which is extremely compact and durable in construction, and wherein all normal stresses are effectively resisted.

Another specific object of the invention is the provision of an improved spring suspension for vehicular bodies, wherein the springs may be mounted directly upon the wheel supporting axle, and may be caused to coact directly with simplified and compact tank reenforcing structure which will effectively sustain the loads.

A further specific object of this invention is to provide an improved tank mounting wherein the tank is reenforced by and mounted upon longitudinal external beam members, which also serve as spring hangers and guards and may be located as far from the longitudinal tank center and as near to the wheels as possible without interference.

Still another specific object of my invention is the provision of an improved spring mounting for vehicular tanks which is relatively light yet extremely durable in construction, and wherein the load is most effectively sustained under all conditions of use.

These and other specific objects and advantages will be apparent from the following detailed description.

A clear conception of an embodiment of my present invention, and of the mode of constructing and of utilizing improved vehicular mountings built in accordance therewith, may be had by referring to the drawings accompanying and forming a part of this specification wherein like reference characters designate the same or similar parts in the various views.

Figure 1:
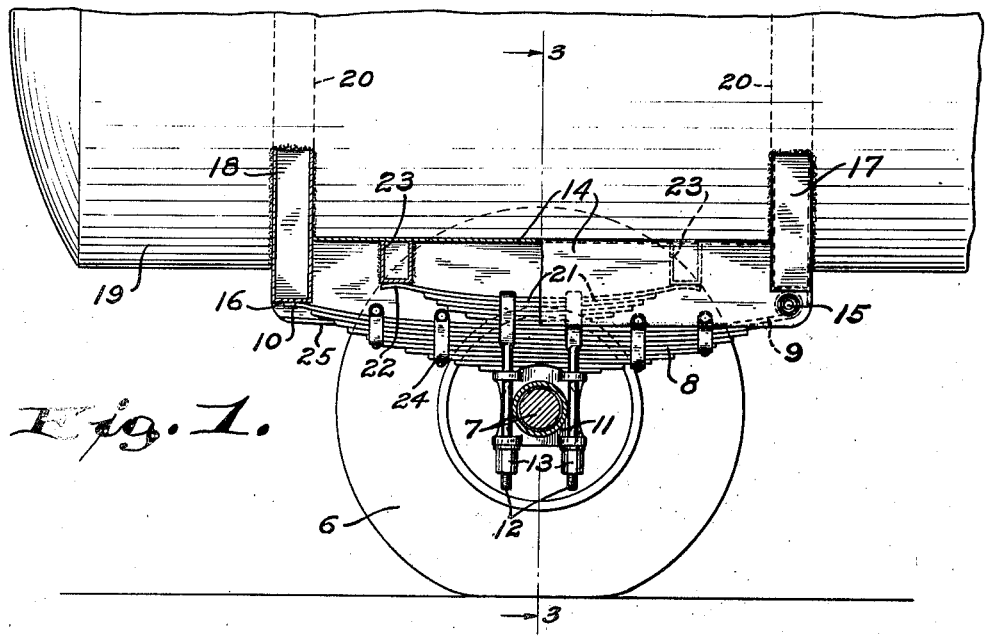
Fig. 1 is a part sectional side elevation of one of my improved vehicular mountings showing the same applied to a fragment of a tank.
Figure 2:
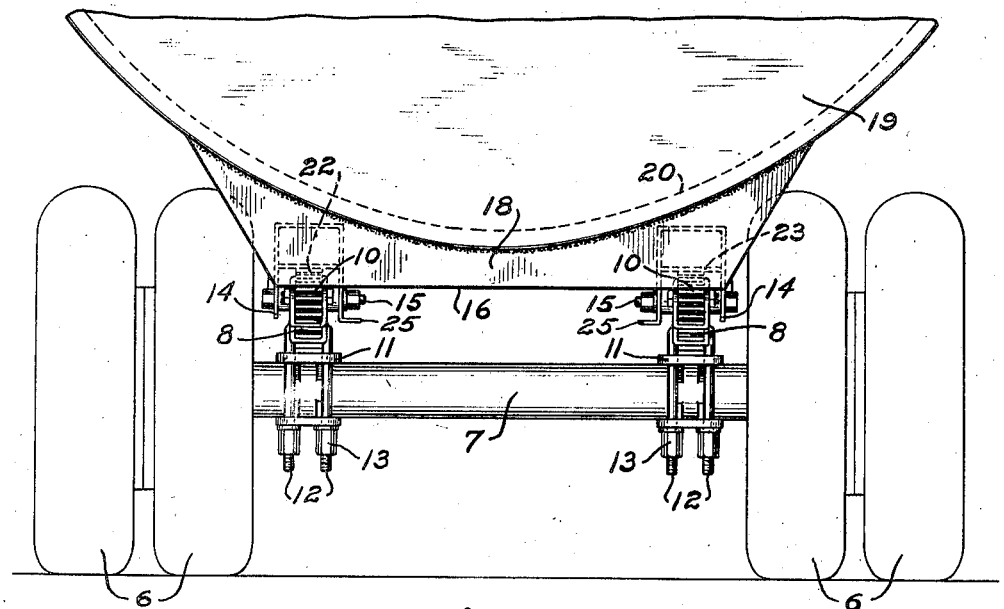
Fig. 2 is a full rear view of the assemblage shown in Fig. 1.
Figure 3:
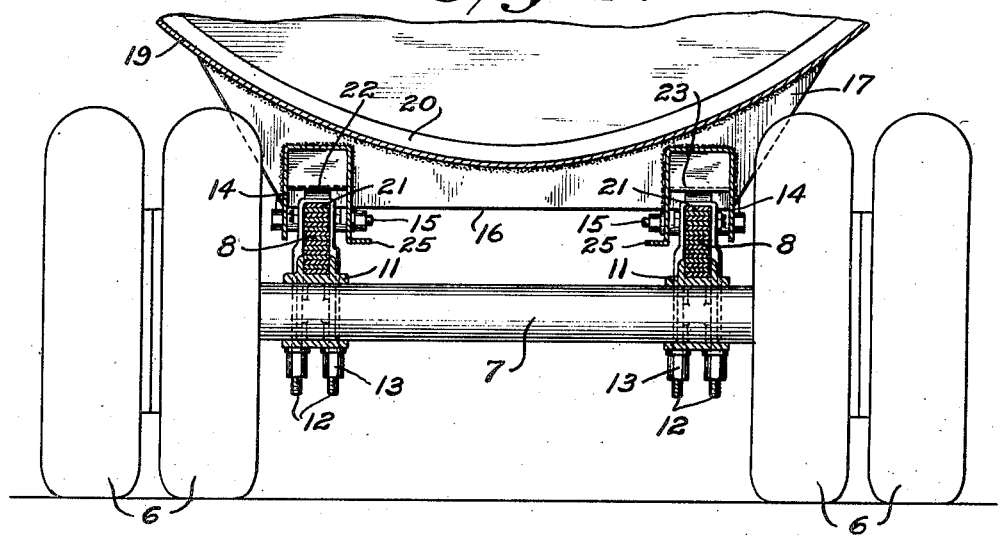
Fig. 3 is a transverse vertical section through the assemblage of Fig. 1, taken along the line 3—3.
Figure 4:
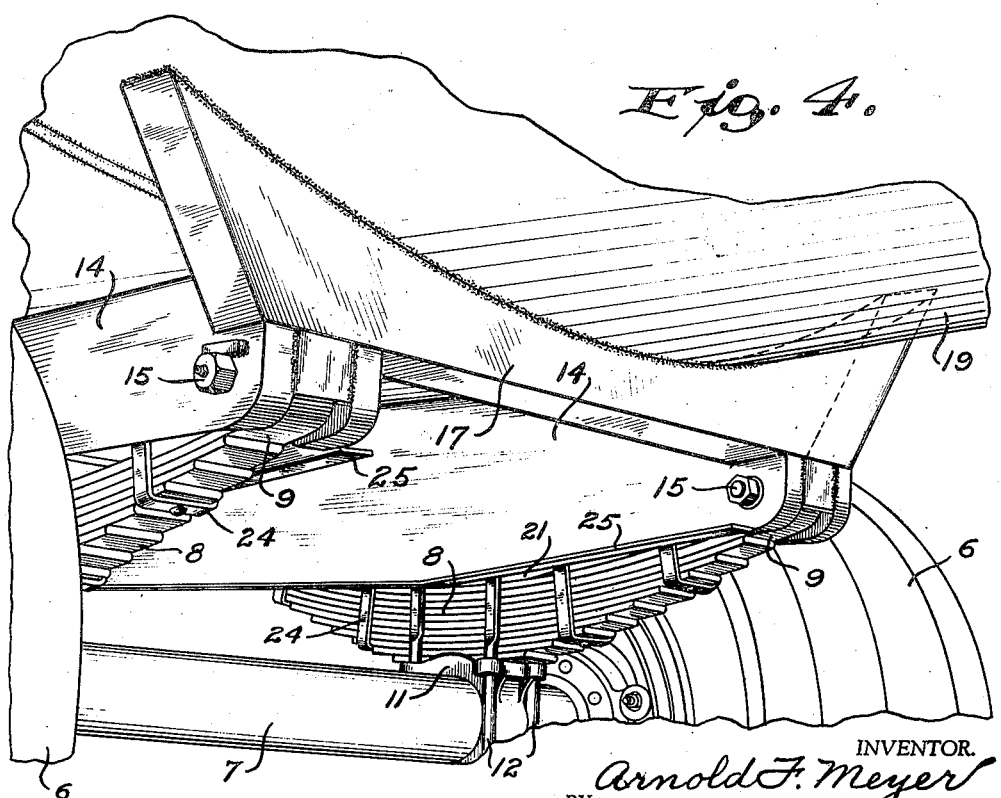
Fig. 4 is a perspective view of the improved vehicular mounting looking upwardly and rearwardly at the assemblage.

While I have shown and described the invention herein, as being specifically applied in a spring mounting of a particular type especially applicable to a so-called frameless semi-trailer tank assemblage, it is not the intent to thereby unnecessarily restrict the scope, since my improved vehicular mounting is obviously more generally applicable to other types of bodies.

Referring to the drawings, the improved vehicular mounting shown therein comprises in general a set of supporting wheels 6 rotatably mounted upon a transverse axle 7 in a well known manner; a pair of main leaf springs 8 supported intermediate their front and rear ends 9, 10, directly from the axle 7 by means of brackets 55

11, and U-bolts 12 secured to the brackets 11 by nuts 13; inverted U-shaped laterally spaced side beams 14 to the front ends of which the front spring ends 9 are pivotally attached by means of shackle bolts 15, and the rear ends of which are provided with lower transverse surfaces 16 with which the rear spring ends slidably coact; front and rear transverse parallel saddle beams 17, 18 rigidly interconnecting the front and rear ends respectively, of the side beams 14, the surface 16 constituting a part of the rear beam 18; a liquid transporting tank 19 resting within and rigidly attached to the saddle beams 17, 18 and having internal reenforcing members or rings 20 adjoining these beams; and a pair of auxiliary leaf springs 21 coacting at their medial portions with the upper portions of the springs 8 and having opposite end portions 22 slidably engaging transverse braces 23 secured within the side beams 14.

The wheels 6, axle 7 and main springs 8 are all of more or less standard construction, and the wheels 6 are spaced apart the usual distance while the springs 8 are preferably secured to the axle 7 as closely adjacent to the wheels as possible. The U-bolts 12 and nuts 13 coact with the brackets 11 and with the medial portions of both the main and auxiliary springs 8, 21, to firmly clamp these springs in position upon the axle 7, and the main leaf springs 8 may be embraced by other straps 24 which serve to prevent undesirable spreading of the leaves thereof.

The longitudinal U-shaped side beams 14 may be formed of relatively heavy sheet metal, and the lower edges of the inner walls of these beams are reenforced by means of lateral flanges 25. The transverse saddle beams 17, 18 may also be formed of relatively heavy sheet metal, and the ends of these saddle beams are welded or otherwise rigidly attached to the ends of the side beams 14 so as to provide a rigid substantially rectangular saddle frame. The side beams 14 are additionally stiffened and reenforced by the cross braces 23 with which the small springs 21 coact; and these springs are completely housed within the hollow beams 14, while the other springs 8 are partially concealed within the side beams.

The vehicle body or tank 19 is ordinarily likewise formed of sheet metal, and is usually of elliptical shape with the major diameter extending horizontally. The tank sides project over the wheels 6, and in order to provide for maximum support, the ends of the saddle beams 17, 18 which are located forwardly and rearwardly beyond the wheels 6, are extended outwardly as far as possible. The saddle beams 17, 18 are preferably welded or otherwise rigidly attached to the lower portion of the tank 19, and the internal reenforcing bands or rings 20 are rigidly attached to the interior of the tank shell adjacent to each beam 17, 18 by welding or otherwise.

During normal use of the improved assemblage, the weight of the tank 19 and its load, is carried by the wheels 6 through the axle 7, springs 8, 21, side beams 14, and transverse saddle beams 17, 18. When the wheels 6 are transported over uneven highways, the springs 8, 21 will flex, and since the front ends 9 of the main springs 8 are pivotally attached to the beams 14 by the shackle bolts 15, elongation of these springs due to deflection thereof will be compensated for by sliding of the rear spring ends 10 upon the lower surface 16 of the rear saddle beam 18. Elongation of the auxiliary springs 21 due to deflection thereof will likewise be compensated for by sliding of the ends 22 thereof upon the lower surfaces of the cross-braces 23, and the two sets of springs 8, 21 will thus act to resiliently suspend the tank assemblage from the transporting wheels 6.

Because of the fact that the spring mountings are spaced apart as far as possible and are disposed directly adjacent to the wheels 6, and also because the transverse beams 17, 18 are relatively wide and extend considerably beyond the inner sides of the inner wheels 6, the tank 19 is supported in an extremely effective manner especially as to off-set loads. By spacing the saddle beams 17, 18 as far apart as possible, and by providing internal reenforcing rings 20 directly adjacent to these saddle beams, the load is most effectively distributed; and the formation of the side beams of inverted U-shape, combined with the reenforcing braces 23 and flanges 25, not only produces an extremely rigid saddle assemblage, but also provides an effective housing for the springs. The height of the supporting frame assemblage is also reduced to a minimum by causing the springs 8, 21 to coact directly with the saddle forming beams 14, 17, 18, thereby permitting location of the center of gravity of the load near the ground, and it is also noteworthy that while the saddle assemblage is extremely compact, it will not interfere with the normal operation of the wheels 6. The tank 19 is obviously effectively supported and reenforced against undesirable distortion without the aid of a separate frame or chassis extending longitudinally throughout the tank length, thereby making the present invention especially adaptable to so-called frameless semi-trailers wherein the tank itself sustains the beam loads between its opposite ends.

From the foregoing detailed description, it will be apparent that my present invention provides an extremely compact and durable vehicular body mounting especially applicable to liquid transporting tanks, which will effectively sustain the loads. The improved assemblage is obviously relatively light but exceedingly strong, and may be manufactured of sheet metal at extremely moderate cost. The improvement has proven highly successful in actual use, and has enabled the production of a semi-trailer assemblage of neat appearance having large capacity and relatively low overall height.

It should be understood that it is not desired to limit this invention to the exact details of construction or to the precise mode of use, herein shown and described, for various modifications within the scope of the claims may occur to persons skilled in the art.

I claim:—

1. In combination, an axle having transporting wheels, a vehicular tank located above said axle, saddle beams coacting with said tank forwardly and rearwardly of said axle, side beams interconnecting said saddle beams and being located adjacent to said wheels, main springs interposed between said axle and the opposite ends of said side beams, and auxiliary springs interposed between said main springs and the medial portions of said side beams.

2. In combination, an axle having transporting wheels, a vehicular tank located above said axle, parallel transverse saddle beams coacting with the bottom of said tank forwardly and rearwardly of said axle, inverted U-shaped side beams interconnecting said saddle beams adjacent to said wheels, main springs having their medial portions mounted directly upon said axle and having end portions coacting with the ends of said side beams, and auxiliary springs carried by said main springs and coacting with intermediate portions of said side beams, said auxiliary springs being housed within said side beams.

3. In combination, an axle having laterally spaced transporting wheels, a vehicle body located above said axle between and above said wheels, saddle beams coacting with said body forwardly and rearwardly of said wheels and extending outwardly beyond the inner sides thereof, side beams rigidly interconnecting said saddle beams and being located adjacent the inner sides of said wheels, leaf springs interposed between said axle and the ends of said side beams, and other springs interposed between said leaf springs and the medial portions of said side beams.

4. In combination, an axle having laterally spaced transporting wheels, a vehicle body located above said axle between and above said wheels, saddle beams coacting with said body forwardly and rearwardly of said wheels and extending outwardly beyond the inner sides thereof, side beams rigidly interconnecting said saddle beams and being located adjacent the inner sides of said wheels, leaf springs interposed between said axle and the ends of said side beams, and other springs interposed between said leaf springs and the medial portions of said side beams, said other springs being housed within said side beams.

5. In combination, an axle having transporting wheels near the opposite ends thereof, a vehicle body having an elongated shell extending rearwardly over said axle and laterally over said wheels, spaced saddle beams rigidly attached to the underside of said shell forwardly and rearwardly of said axle and extending outwardly beyond the inner sides of said wheels, laterally spaced side beams disposed between said wheels below the upper portions thereof and above said axle and having their front and rear ends rigidly attached to said saddle beams but being spaced from said shell, and leaf springs having their medial portions supported directly by said axle between said wheels and their end portions coacting with the ends of said side beams adjacent to said saddle beams.

6. In combination, an axle having transporting wheels near the opposite ends thereof, a vehicular tank having an elongated shell extending rearwardly over said axle and laterally over said wheels, spaced U-shaped saddle beams rigidly attached to the underside of said shell forwardly and rearwardly of said axle and extending outwardly beyond the inner sides of said wheels, laterally spaced inverted U-shaped side beams disposed between said wheels below the upper portions thereof and above said axle and having their front and rear ends rigidly attached to said saddle beams but being free from direct contact with said shell, and springs resting upon said axle and having front and rear end portions coacting with said side beams near said saddle beams.

7. In combination, an axle having spaced transporting wheels, a tank having an elongated shell extending rearwardly over said axle and being provided with transverse internal braces located forwardly and rearwardly of the axle, saddle beams rigidly attached to the underside of said shell in vertical alinement with said internal braces, laterally spaced side beams disposed between said wheels below the upper portions thereof and above said axle and having their ends rigidly attached to said saddle beams but being free from direct contact with said shell, and springs interposed between said axle and said side beams.

ARNOLD F. MEYER.